United States Patent [19]
Hadden, Jr.

[11] 3,914,750
[45] Oct. 21, 1975

[54] MNOS MEMORY MATRIX WITH SHIFT REGISTER INPUT AND OUTPUT

[75] Inventor: David R. Hadden, Jr., Eatontown, N.J.

[73] Assignee: The United States of America as represented by the Secretary of the Army, Washington, D.C.

[22] Filed: Dec. 5, 1974

[21] Appl. No.: 529,876

[52] U.S. Cl. .......... 340/173 R; 307/221 C; 307/238
[51] Int. Cl.[2] G11C 8/00; G11C 11/40; G11C 19/28
[58] Field of Search ...... 340/173 R, 173 FF, 166 R; 307/221 C, 238, 251

[56] References Cited

UNITED STATES PATENTS 3,824,564 7/1974 Wegener ........................ 340/173 R

*Primary Examiner*—Stuart N. Hecker
*Attorney, Agent, or Firm*—Nathan Edelberg; Robert P. Gibson; Michael J. Zelenka

[57] ABSTRACT

A block-oriented, random-access memory employs an $m \times n$ matrix of MNOS semiconductor devices and a two-part MOS shift register. The memory is non-volatile and is suitable for integrated circuit manufacture using LSI techniques.

6 Claims, 4 Drawing Figures

MNOS MEMORY MATRIX WITH SHIFT REGISTER INPUT AND OUTPUT

GOVERNMENT LICENSE

The invention described herein may be manufactured and used by or for the Government for governmental purposes without the payment of any royalties thereon or therefor.

BACKGROUND OF THE INVENTION a. Field of the Invention

Broadly speaking, this invention relates to a block-oriented, random-access memory. More particularly, in a preferred embodiment, this invention relates to a block-oriented, random-access memory utilizing metal nitride-oxide semiconductors (MNOS) as the storage devices.

b. Discussion of the Prior Art

The ever-increasing trend to miniaturization in computers has led to a search for an integrated circuit substitute for conventional block-oriented, random-access memory devices, such as magnetic discs or drums. The problem is that prior attempts to design such a circuit have resulted in an integrated circuit chip that is exceedingly complex, and hence expensive and difficult to manufacture.

SUMMARY OF THE INVENTION

Accordingly, it is an object of this invention to provide a block-oriented, random-access memory device that can be fabricated using conventional LSI techniques yet which is simple in design and relatively inexpensive to manufacture.

A preferred embodiment of the invention comprises a nonvolatile memory for storing up to *n*, *m*-bit binary words. The memory includes an $n \times m$ matrix of threshold-sensitive semiconductor devices, each having a gate electrode and first and second current-carrying electrodes and an *m*-stage, dynamic shift register. The memory further includes *m*-pairs of first and second memory busses, each pair of busses being connected to a corresponding one of the stages in the *m*-stage shift register. The first and second current-carrying electrodes of each semiconductor device in a given column of the matrix are respectively connected to the first and second memory busses in a corresponding pair of memory busses. The memory also has *n*-row selection busses, the gate electrode of each semiconductor device in a given row of the matrix being connected to the corresponding one of the row selection busses. Means, connected to the input stage of the shift register, are provided to supply the *m*-bit binary words which are to be stored in the memory. Means, connected to the output stage of the shift register, are also provided to receive the *m*-bit words which are read-out of the memory. Finally, means, connected to each stage of the shift register, are provided to serially advance each of the *m*-bit binary words through the *m*-stages thereof and then to shift the *m*-bits, in parallel, to a selected one of the rows of the matrix for storage therein, via the first and second memory busses.

The invention and its mode of operation will be more fully understood from the following detailed description, when taken with the accompanying drawings, in which:

DETAILED DESCRIPTION OF THE INVENTION

Figure 1:
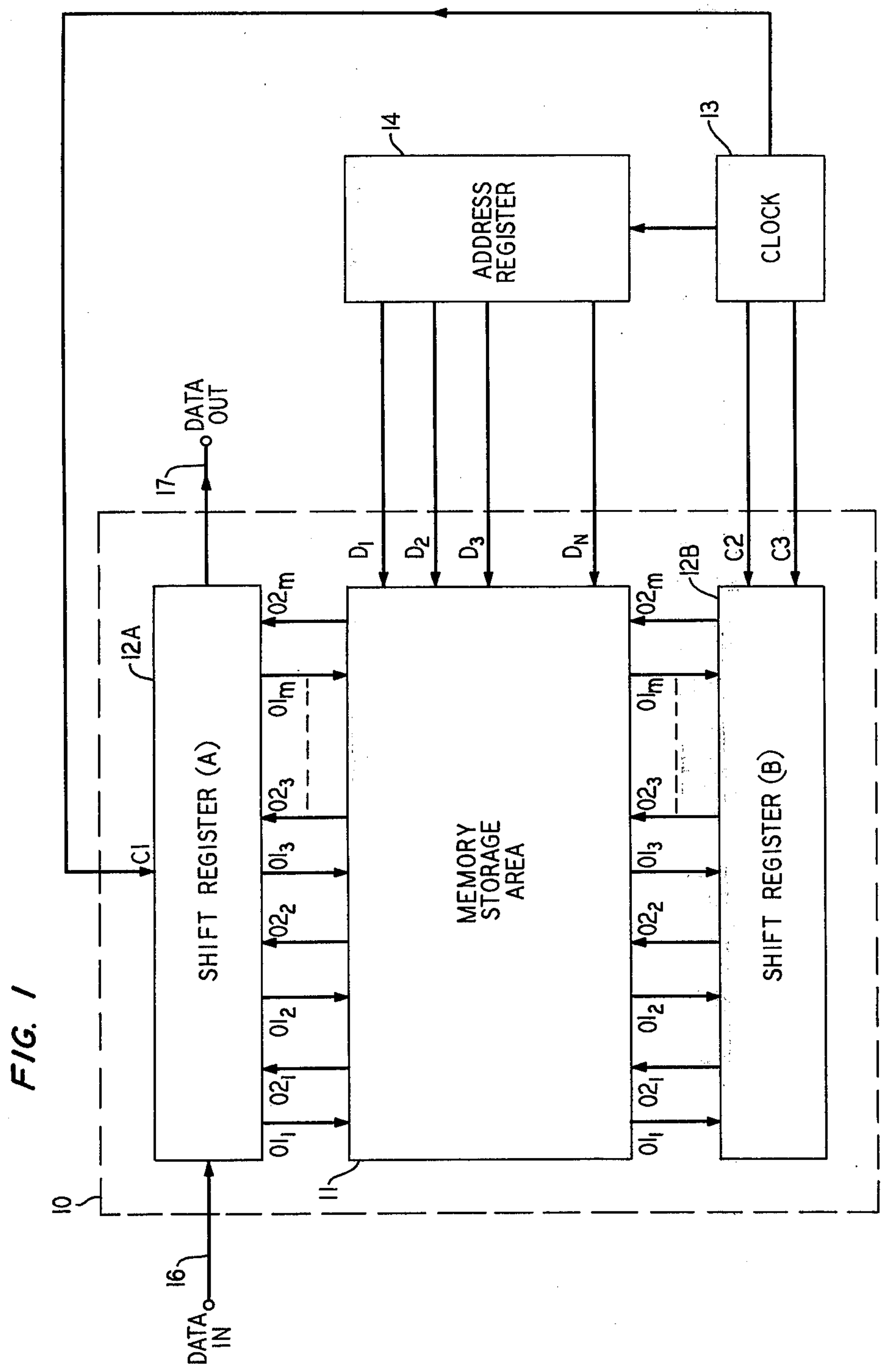
FIG. 1 is a schematic drawing of an illustrative block-oriented memory according to the invention.

FIG. 1 depicts in block schematic form an illustrative, random-access memory according to the invention together with the operating environment therefor and is helpful in explaining the operation of the invention.

As shown, memory 10 comprises a memory storage area 11 which is connected to a two-part shift register $12_A$ and $12_B$ by a plurality of memory busses $01_1 - 01_m$ and $02_1 - 02_m$. A clock circuit 13 provides clock pulses to register $12_A$, via line C1, and to register $12_B$, via lines C2 and C3. An address register 14 is connected to memory storage area 11 by a plurality of row selection busses $D_1 - D_n$. As will be explained below, memory storage area 11 actually comprises an $m \times n$ matrix of memory storage devices, advantageously MNOS semiconductors. The binary data to be stored in memory 10 is applied serially to the shift registers $12_A$ and $12_B$, via an input conductor 16, and is read-out of the memory by an output conductor 17 connected to the opposite end of the shift register. As will also be explained more fully below, an m-bit binary word is applied to shift register $12_A$ and $12_B$, in serial form, and passes through each of the m stages of the shift register until the entire *m*-bit word is stored. At this time, the appropriate row selection bus is energized by address register 14 and the entire *m*-bit word is stored, in parallel, to the corresponding row of storage devices in memory storage area 11. The read-out operation is entirely analogous. First, the desired *m*-bit word is read, in parallel, from the corresponding row of storage devices into the shift register, then the register is pulsed to output the data, in serial form, on conductor 17. Clock 13 and address register 14 are entirely conventional and form no part of this invention.

Figure 2:
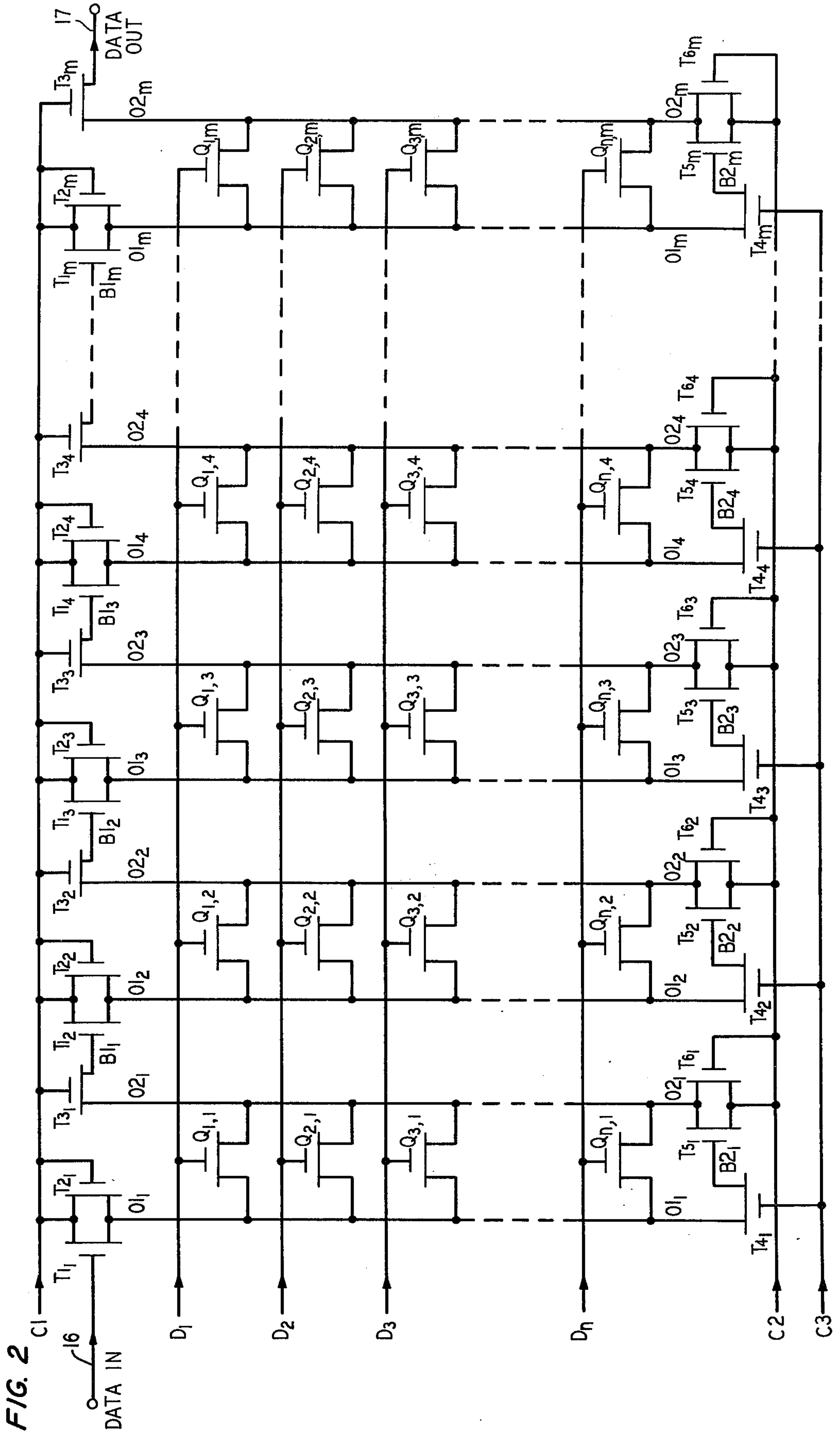
FIG. 2 depicts the memory shown in FIG. 1 in considerably more detail.

Turning now to FIG. 2, it will be seen that memory storage area 11 actually comprises an $m \times n$ matrix of semiconductor storage devices Q1,1 through Qn,*m*. The gate of each device in a given row is connected to a corresponding one of the row selection busses $D_1 - D_n$. For example, in row 3, the gate of devices Q3,1 through Q3,*m* are all connected to bus $D_3$. In any given column, the left hand electrode of each storage device is connected to an 01 memory bus while the right hand electrode is connected to an 02 memory bus. For example, in column 3, the left hand electrode of devices Q1,3 through Qn,3 are connected to bus $01_3$ while the right hand electrodes are connected to bus $02_3$.

Each stage of shift register 12A comprises three semiconductor devices $T_1$, $T_2$ and $T_3$ while the corresponding stage of shift register 12B comprises three semiconductor devices $T_4$, $T_5$ and $T_6$. Actually, in operation there are not two separate shift registers, but merely two halves of the same shift register. In each stage, the source electrode of transistor $T_1$ is connected to the drain electrode of transistor $T_2$, and vice-versa. The drain and gate electrodes of transistor $T_2$ are connected to clock-pulse conductor C1 while the drain electrode of transistor $T_1$ and the source electrode of transistor $T_2$ are connected to memory bus 01. In like fashion, the source electrode of transistor $T_6$ is connected to the drain electrode of transistor $T_5$, and vice-versa, while the drain and gate electrodes of transistor $T_6$ are connected to the clock-pulse conductor $C_2$. The drain electrode of transistor $T_5$ and the source electrode of $T_6$ are connected to memory bus 02. One electrode of transistor $T_4$ is connected to memory bus 01 while the other electrode is connected to the gate of transistor $T_5$. The gate of transistor $T_4$ is connected to clock-pulse conductor $C_3$. The gate of transistor $T_3$ is connected to clock-pulse conductor C1, while one of the other two electrodes is connected to memory bus 02. In all stages other than the first, the other electrode of transistor $T_3$ is connected to the gate of the transistor T1 in the next stage. The data input on conductor 16 is connected to the gate of transistor $T1_1$ in column 1 while, the data output on conductor 17 is connected to the electrode of transistor $T_{3m}$.

Advantageously, transistors Q1,1 through Qn,*m* are metal nitride-oxide semiconductors devices (MNOS) while transistors $T_1 - T_6$ in each stage of the shift register are metal oxide semiconductors (MOS). All devices, other than transistors $T_1$, $T_2$ and $T_5$, $T_6$ are symetric devices. The source-drain interconnection of transistors $T_1$, $T_2$ and $T_5$, $T_6$ results in a dynamic inverter; thus, the shift register formed by transistors $T_1 - T_6$ is a dynamic shift register.

Figure 3:
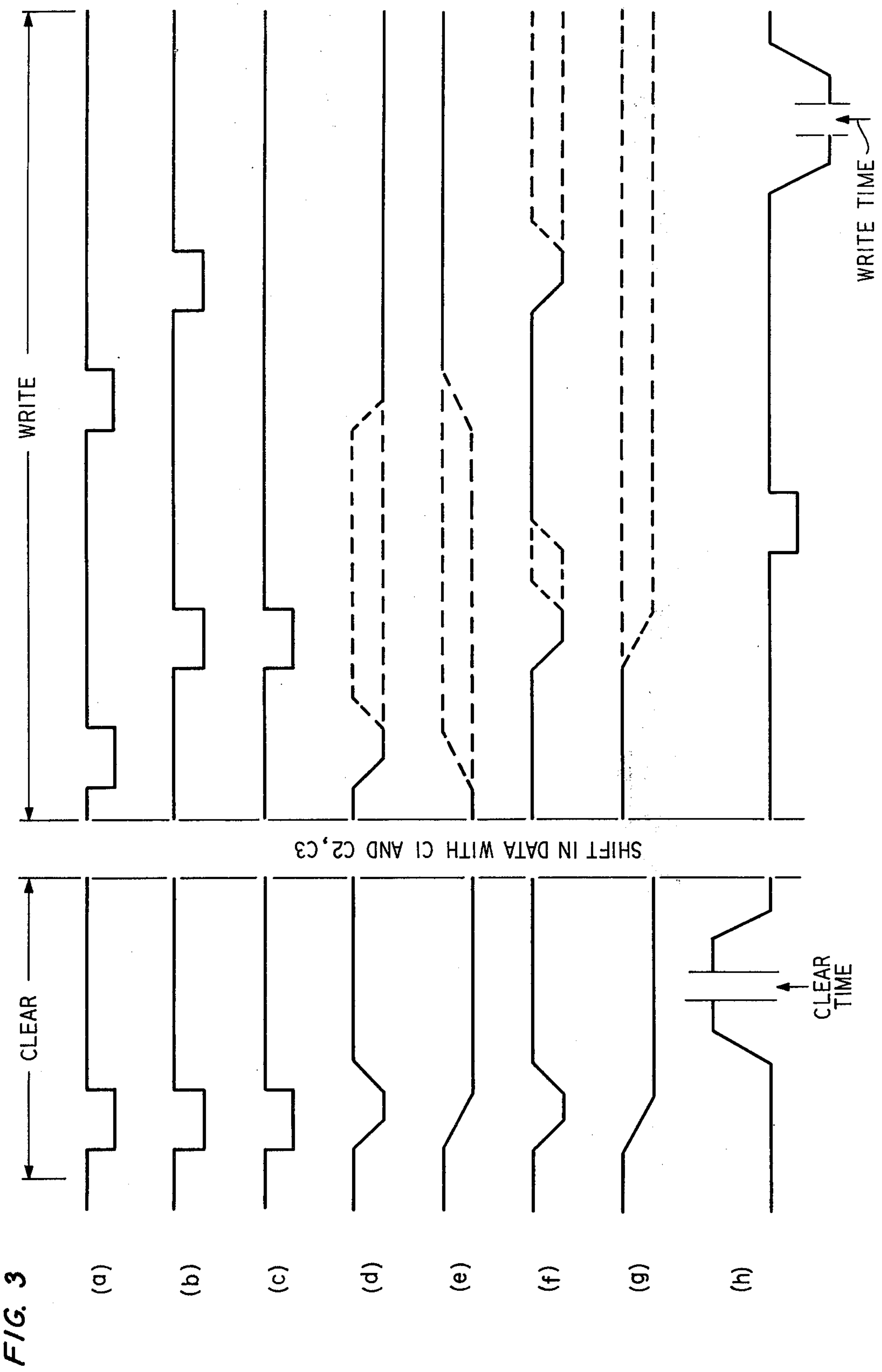
FIG. 3 shows various waveforms which are present in the memory shown in FIG. 2 during the "clear" and "write" cycles.

In operation, and with reference also to FIG. 3, it is first necessary to clear a given row in the memory matrix before a new data word can be written therein. This is accomplished by first simultaneously applying a negative clock-pulse to clock-pulse conductors C1, C2 and C3, which conductors subsequently return to zero potential (FIGS. 3*a,b,c*). The effect of this is to turn-on to ground all the dynamic inverters in all stages of the shift register. This has the effect of grounding all 01 and 02 memory busses in the memory (FIGS. 3*d,f*). At this time, all gates $B_1$ and $B_2$ will also go to ground (FIGS. 3*e,g*). Next, the particular row select bus corresponding to the row in which the data word is to be stored receives a positive pulse. This pulse (FIG. 3*h*) must be of sufficient time duration to clear all MNOS devices in that row, i.e., to erase any information which may priorly have been stored in these non-volative memory devices.

The first bit of the *m*-bit data word is now applied to the gate of device $T_1$. By first pulsing clock conductor C1 and then pulsing clock conductors C2 and C3 this bit is transferred, via bus $01_1$, to device $T4_1$ then, via bus $02_1$, to device $T3_1$ so that when the next pulse appears on clock conductor C1 the bit will be transferred to the $B1_1$ gate of transistor $T1_2$. By alternately pulsing conductors C1 and C2, C3 the bits of the data word are transferred from stage to stage of the register until the first bit is stored in the $(m - 1)$th stage of the register.

The data is now written into the MNOS devices of the desired row by pulsing C2 and C3 together (FIGS. 3*b,c*). This transfers the information from the upper half of the shift register to the lower half. Now, for all stages of the register where a binary 1 is being stored the 02 bus will be negative and, due to the inverting nature of the shift register, the corresponding 01 bus will be at zero potential (or floating). All MNOS devices in the given row are next gated-on by pulsing the row-select bus negative (FIG. 3*h*). The conduction of the MNOS devices ensures that all 02 busses (including those previously negative due to storage of a binary 1) will go to zero potential.

The zero potential condition of all 02 busses is now gated into the upper inverters ($T_1$, $T_2$) by pulsing clock-conductor C1 (FIG. 3*a*), which in turn causes all 01 busses to go negative. All 02 busses are now reconditioned by pulsing clock conductor C2, but not C3 (FIG. 3*b*). The potential on the 02 busses will be zero if the corresponding shift register stage is storing a logical 1 and negative if it is storing a logical 0.

The particular row select bus is again driven negative (FIG. 3*h*) to store the data in the memory. All MNOS devices whose gates are connected to the row select bus and which are connected to a lower inverter stage of the shift register which is on, i.e., which in storing a logical 1, will be written into. In this manner, the entire *m*-bit binary word is transferred, in parallel, from the shift register to the selected row of the memory.

Figure 4:
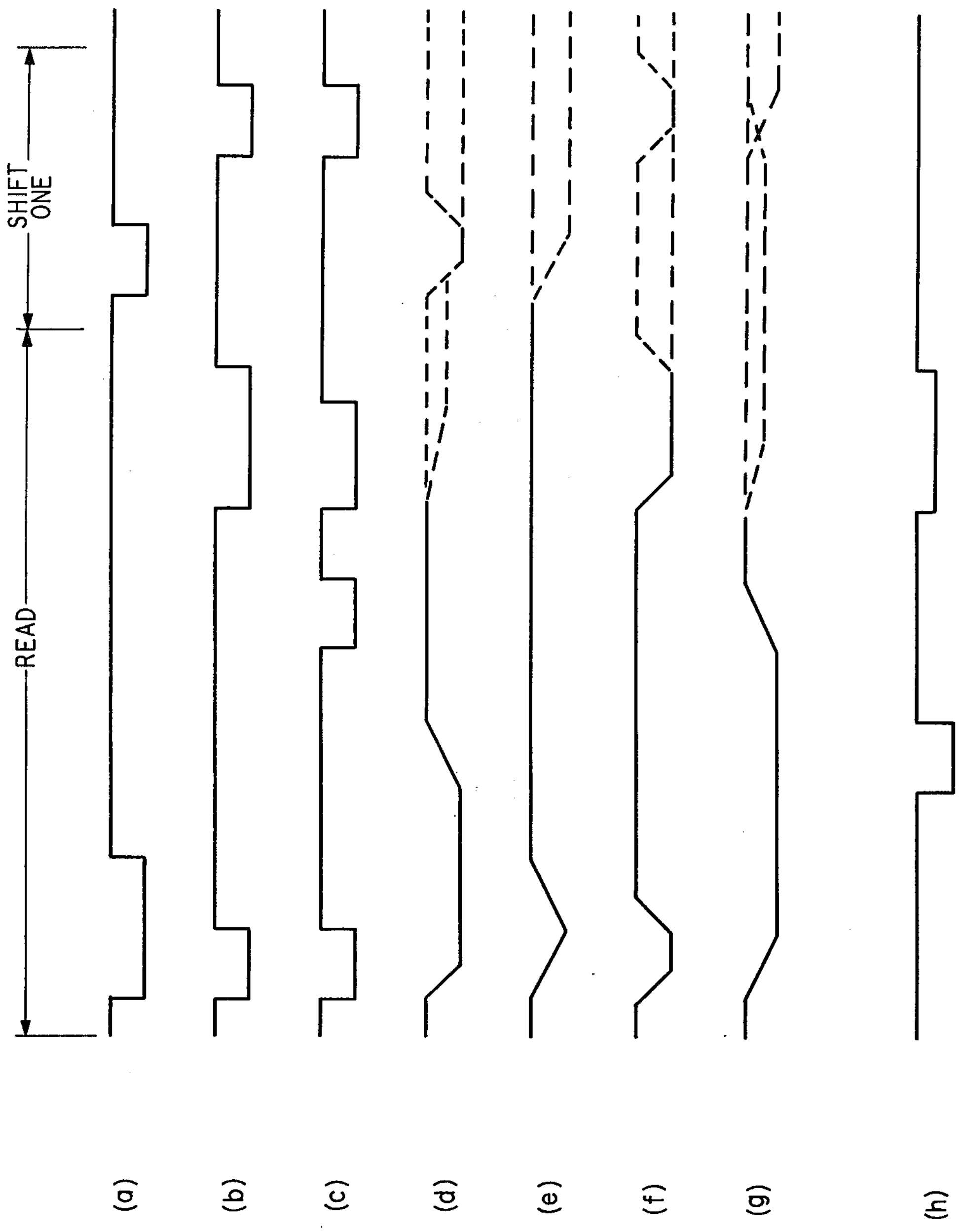
FIG. 4 shows the corresponding waveforms during the "read" cycle.

Read-out of data stored in a given row is entirely analogous. Referring now also to FIG. 4, all clock pulse conductors are driven negative, then C2 and C3 driven to zero, followed a short time later by C1 (FIG. 4*a,b,c*). This operation sets the shift register to a known condition, i.e., the condition where all 01 busses are negative and all 02 busses are at zero potential. Next, the desired row-select bus is driven sufficiently negative to turn-on all the MNOS storage devices whose gates are connected to that line (FIG. 4*h*). This, in turn, will conduct all 01 memory busses in the memory to zero potential. Clock pulse line C3 is then pulsed negatively (FIG. 4*c*) to discharge all B2 gates on devices $T5_1 - T5_m$ to zero (FIG. 4*g*).

Recalling that MNOS semiconductor devices are threshold devices and that the threshold of an MNOS device storing a binary 1 is different from one which is storing a binary 0, clock-lines C2 and C3 are driven negative (FIGS. 4*b,c*) at the same time that the desired line-select bus is driven sufficiently negative (FIG. 4*h*) to exceed the threshold of only those MNOS devices which do not have stored charge.

Now it will be recalled that all 01 busses are at zero potential and, due to the negative clock-pulse on C2, all 02 busses are negative; thus, all B1 gates are off and there will be a conductor path through all MNOS devices which have been turned-on by the negative pulse on the row-select conductor to the B2 gates on the lower half of the shift register.

Accordingly, after a sufficient time interval for the B2 gate to charge negatively through the conducting MNOS devices, clock lines C3 and then C2 are driven back to zero (FIG. 4*b,c*) and the row select bus is driven back to zero (FIG. 4*h*). In other words, the *m*-bit data word previously stored in a given row of MNOS storage devices has been captured by the lower half of the shift register. This data word is then shifted out of the register on line 17 by alternately pulsing clock lines C1 and C2, C3 as described above in connection with memory storage.

An alternate operated mode for read-out, is to combine into a single time slot the first negative pulsing of the row select line with the second pulsing of clock line C3 (to discharge all B2 gates to zero). This has the effect of discharging the B2 gates only to just below their individual thresholds, because the path to ground for the OR busses is interrupted when the $T5_1 - T5_m$ devices turn-off. The subsequent sense and recharge cycle is then shorter and more sensitive.

One skilled in the art may make various changes and substitutions to the layout of parts shown without departing from the spirit and scope of the invention.

What I claim is:

1. A random-access, block-oriented, non-volatile memory for storing up to $n$, $m$-bit binary words, which comprises:

an $n \times m$ matrix of threshold-sensitive, semiconductor devices, each having a gate electrode and first and second current-carrying electrodes;

an $m$-stage, dynamic shift register;

$m$-pairs of first and second memory busses, each pair of busses being connected to a corresponding one of the stages in said $m$-stage shift register, the first and second current-carrying electrodes of each semiconductor device in a given column in said matrix being respectively connected to the first and second memory busses in a corresponding pair of memory busses;

$n$-row selection busses, the gate electrode of each semiconductor device in a given row of said matrix being connected to the corresponding one of said row selection busses;

means, connected to the input stage of said shift register for supplying the $m$-bit binary words to be stored in said memory;

means, connected to the output stage of said shift register, for receiving the $m$-bit binary words readout of said memory; and means, connected to each stage of said shift register, for serially advancing each of said $m$-bit binary words through the $m$-stages thereof and then shifting the $m$-bits, in parallel, to a selected one of the rows of said matrix for storage therein, via said first and second memory busses.

2. The memory according to claim 1 wherein said semiconductor devices comprises metal nitride-oxide semiconductor devices.

3. The memory according to claim 1 wherein:

said advancing means comprises first, second and third means for supplying clock-pulses;

each stage of said shift register comprises a first and a second sub-circuit, each sub-circuit including a dynamic inverter and a gate, said first sub-circuit gate being connected to said first clock-pulse supplying means and to said second memory bus, said first sub-circuit inverter also being connected to said first clock-pulse supplying means and to said first memory bus, said second sub-circuit gate being connected to said third clock-pulse supplying means and to said first memory bus, said second sub-circuit inverters being connected to said second clock-pulse supplying means and to said second memory bus, each first sub-circuit gate being connected to a control element of the first sub-circuit inverter in the next stage of said register, each second sub-circuit gate being connected to a control element of the second sub-circuit inverter in the same stage of said shift register;

said binary word supplying means being connected to a control element of the first sub-circuit inverter of the first stage of said shift register; and said receiving means being connected to the first sub-circuit gate in the last stage of said shift register.

4. The memory according to claim 3 wherein:

said first sub-circuit inverter comprises a first and a second field-effect semiconductor device each having a gate, a source and a drain electrode, the source electrode of said first field-effect semiconductor device being connected to the drain electrode of said second field-effect semiconductor device and to said first clock-pulse supplying means, the drain electrode of said first field-effect semiconductor device being connected to the source electrode of said second field-effect semiconductor device and to said first memory bus;

said first sub-circuit gate comprises a third field-effect semiconductor device having a gate and first and second current-carrying electrodes, said gate being connected to said first clock-pulse supplying means, said first current-carrying electrode being connected to said second memory bus and said second current-carrying electrode bieng connected to the gate of the first field-effect semiconductor device in the first sub-circuit inverter of the next succeeding shift register stage, the gate of the second field-effect semiconducor device in said first sub-circuit inverter being connected to said first clock-pulse supplying means.

5. The memory according to claim 4 wherein said second sub-circuit inverter comprises a fourth and a fifth field-effect semiconductor device each having a gate, a source and a drain electrode, the source electrode of said fourth semiconductor device being connected to the drain electrode of said fifth semiconductor device and to said second clock-pulse supplying means, the source electrode of said fifth semiconductor device being connected to the drain electrode of said fourth semiconductor device and to said second memory bus, the gate of said fifth semiconductor device being connected to said second clock-pulse supplying means;

said second sub-circuit gate comprises a sixth semiconductor device having a gate, and first and second current-carrying electrodes, said gate being connected to said third clock-pulse supplying means, said first current-carrying electrode being connected to said first memory bus and said second current-carrying electrode being connected to the gate of the fourth field-effect semiconductor device of the second sub-circuit inverter in the same stage of said shift register.

6. The memory according to claim 5 wherein said first through said sixth field-effect semiconductor devices, inclusive, are metal-oxide semiconductor devices.

* * * * *